Dec. 1, 1964   O. BRETSCHNEIDER ETAL   3,159,021
PROCESS FOR DETECTION OF LEAKS IN INDUSTRIAL VACUUM PLANTS
Filed Oct. 13, 1961

INVENTORS
OTTO BRETSCHNEIDER
GERHART JAEKEL
HERBERT DISKOWSKI
BY Connolly and Hutz
ATTORNEYS 3,159,021
PROCESS FOR DETECTION OF LEAKS IN INDUSTRIAL VACUUM PLANTS
Otto Bretschneider, Bonn-Venusberg, and Gerhart Jaekel and Herbert Diskowski, Knapsack, near Cologne, Germany, assignors to Knapsack-Griesheim Aktiengesellschaft, Knapsack, near Cologne, Germany, a corporation of Germany
Filed Oct. 13, 1961, Ser. No. 144,878
Claims priority, application Germany Oct. 14, 1960
3 Claims. (Cl. 73—49.7)

The present invention relates to a process for controlling the qualitative and quantitative composition of the atmosphere in vacuum plants operating on an industrial scale in the chemical and metallurgical industries.

The control of the composition of the atmosphere in industrial vacuum plants acquires an increasing importance as discontinuous processes are replaced by continuous processes and as the dimensions and branchings of the plants grow.

Up to now only approaches to the solution of the problem in question have been made and these approaches are in most cases restricted to the detection of irregularities which have already occurred and which are noticed by an undesired alteration of the product or changes in pressure. In industrial great-spaced plants leaking must be very great before a change of pressure takes place which could be detected by the measuring apparatuses usually applied in industry. For example, the difference of pressure caused in a volume of 50 cubic meters by leaking enabling 50 liters per hour to penetrate is but 0.76 mm./Hg per hour. In large plants it is in general very difficult and takes much time to find and localize a leaking point. In all continuous processes this will cause troubles of operation.

The present invention consists in continuously taking off samples of gas with the application of a vacuum which is greater than that prevailing in the vacuum plant, from parts of apparatuses of a large plant which are situated at different places or from different points of one and the same part of apparatus, at which places the atmosphere has not yet been able to react with the substances contained in the total plant in the solid, liquid, vaporous or gaseous state and examining the composition of the samples of gas by analysis in known manner, without any interruption of operation being necessary.

According to one embodiment of the invention which is directed to the control in a special part of apparatus through which the current of the normal scavenging gas does not pass, an additional current of a known quantity of pure scavenging gas is temporarily introduced into this part of apparatus and the change of its concentration is ascertained by samples taken off from different points of the same part of apparatus.

In the silicothermal production of magnesium which for example, in which no gaseous reaction products or no reaction residues are obtained and which is carried out under reduced pressure the correct composition of the atmosphere in the reaction zone or the absence of certain gases in the reaction is of importance for the undisturbed course of the reaction and the undisturbed condensation of the magnesium vapor which is set free.

In the silicothermal production of magnesium which serves as an example to illustrate the process of the invention undesired and detrimental gases may be involuntarily introduced into the reaction chamber and stay there as impurities of the scavenging gas (hydrogen and/or rare gases, in particular argon) or as being adsorbed on the surfaces of substances taking part in the reaction. They may also penetrate from the outside air into the reaction chamber or the condenser through untight points in the wall of the reaction chamber or through untight points in the detachable coupling and connecting pieces of the individual parts of the apparatus, this being the case in particular when an elevated temperature is applied. As parts of apparatus which are particularly susceptible to disturbances there may be mentioned the devices serving to introduce fresh material into the reaction chamber and to discharge the residue which has reacted from the reaction chamber. In cases of this kind it is a particular advantage that the composition of the atmosphere in the intermediate container which must be installed between the shutoff devices can be controlled before the said container is again connected with the total plant.

Inadmissible changes in the composition of the atmosphere of the reaction chamber lead to a disturbance of the course of the production and can thereby easily be recognized as such. Such a change in the composition of the atmosphere can be prevented by a regular control of the atmosphere concerned.

It has been found that an undisturbed course of the production can best be ensured by taking off samples of gas from different places of the plant and by examinig their composition in known manner before they can react again with the substances taking part in the reaction.

Since industrial vacuum plants often have considerable dimensions it is indispensable to take off samples of gas at different points of the plant.

This is necessary because the presence of a gas entering, for example, through an untight point near the apparatus inlet cannot always be detected by examining a sample of gas taken off, for example, near the outlet of the apparatus. In many cases disturbing gases of this kind can no more be detected in the off gases. This is especially true of cases in which e.g. air penetrating into the apparatus reacts with the reaction product and can consequently no more be detected in the scavenging gases leaving the apparatus. In the silicothermal production of magnesium which still may serve as an example it is difficult directly to detect air which penetrates into the reaction chamber since the oxygen component is consumed for the formation of magnesium oxide and the nitrogen component is used for the formation of magnesium nitride. The formation of magnesium nitride, however, renders the discharge of the liquid magnesium from the condensing device extremely difficult.

This danger of an overlooked entering of disturbing gases which immediately after their entering are difficult to detect is particularly great in the production of substances having gettering properties such, for example, as calcium, strontium, barium, magnesium, zirconium and thorium.

In this case it is of great advantage to provide in an appropriate manner over the totality of the plant supposed to be very branched a sufficient number of points where gas samples are taken off. According to the present invention the said places are distributed in such a manner that in particular each of the coupling and connecting pieces of the apparatuses which according to experience tend most to untightness is provided with a special point at which gas is taken off.

According to another embodiment of the invention a current of a definite quantity of pure scavenging gas is introduced for a short time into the part of the apparatus concerned and measured while passing through the same in order to quickly find and localize untight places in parts of apparatuses through which the usual scavenging gas does not pass in the course of the operation. The presence of an untight place is perceived by the sudden appearance of air in the additionally introduced quantity of scavenging gas. The portion of air found permits conclusions to be drawn as to the size of the untight place.

The samples of gas can be taken off and examined either continuously or at certain intervals according to circumstances.

The points at which gas samples are taken off are suitably connected by means of appropriate hose lines and/or tubings with a central testing station in which the necessary testing deivces are disposed.

Testing devices which may be used for examining the gas samples drawn off are known and the realization of the process according to the invention does not depend on the special kind of the comparison method applied.

An apparatus embodying the invention will now be described in greater detail by way of example only with reference to the accompanying drawings.

Figure 1:
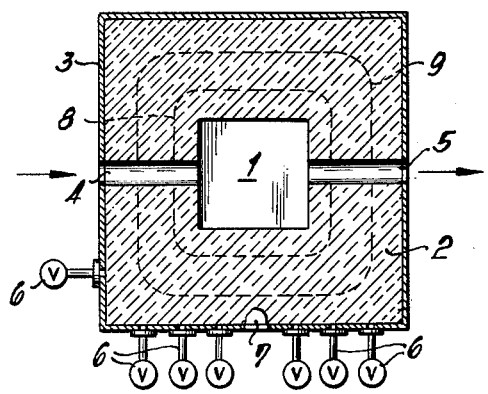
FIG. 1 is a cross-section of a reaction zone housed inside a furnace body which is appropriately lined.

With reference to FIG. 1, a reaction chamber 1 is surrounded by a furnace lining 2 which in its turn is surrounded by a furnace body 3. The scavenging gas is introduced via pipe line 4 and discharged via pipe line 5. The numeral 6 indicates points at which gas is taken off and 7 represents a point in the furnace body supposed to be untight through which air may come in.

If, in the state of equilibrium, the temperature amounts to 1600° C. in reaction chamber 1, to 700° C. on surface 8 surrounding the reaction chamber at all sides, to 200° C. on surface 9 and to 20° C. at the outer surface of the furnace body and if hydrogen is used as scavenging gas, $H_2O$, $N_2$ and $H_2$ can be observed on surface 9 and MgO, $Mg_3N_2$ and $H_2$ may be observed on surface 8, as will be described in Example 1 given below.

Figure 2:
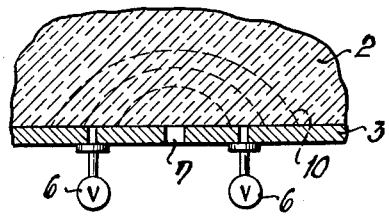
FIG. 2 is a detail of FIG. 1 on an enlarged scale.

FIGURE 2 represents the immediate neighborhood of the supposed untight point 7 on an enlarged scale. It shows, starting from point 7 supposed to be untight, zones which form in furnace lining 2 and in each of which the gas contains the same percentage by volume of air as can be ascertained by samples of gas taken off from each of said zones. If a sufficient number of points are arranged at which gas samples are taken off untight points can thus be localized within a short time.

Figure 3:
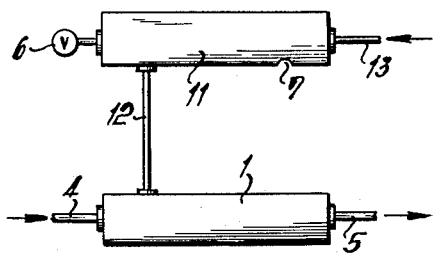
FIG. 3 shows a flow system of a more general nature.

In FIGURE 3, the numeral 1 represents a reaction chamber which is shown diagrammatically and the numerals 4 and 5 represent the conduits through which the scavenging gas is introduced and discharged respectively. Reaction chamber 1 is connected via conduit 12 with closed part 11 of the apparatus. 6 represents a point at which gas is taken off, 7 represents a supposed untight point and 13 represents a connection piece for the introduction of scavenging gas which is used in the test operation described in Example 2 given below.

The following examples serve to illustrate the invention but they are not intended to limit it thereto.

*Example 1*

The reaction chamber of a furnace for the electrothermal preparation of magnesium was provided in known manner with a lining which was inserted into the vacuum-tight furnace body. The temperature which attained its maximum in the reaction chamber constantly sank towards the outside. As scavenging gas hydrogen was passed through the reaction chamber. Under stationary working conditions all hollow spaces and pores of the furnace lining were filled with hydrogen.

When any place whatever of the furnace body became untight, air penetrated at this place into the furnace lining and associated with the hydrogen present in all the hollow spaces and pores of the lining. In the direction in which the pressure dropped, that is to say in the direction towards the reaction chamber the gas mixture underwent further diffusion while its temperature constantly rose. When a certain temperature was attained this gas mixture was transformed into $H_2O$ and $N_2$ to which, as is the rule, varying portions of excess hydrogen coming from the scavenging gas joined. In a zone which was located farther inside, the aforesaid substances, namely $H_2O$, $N_2$ and excess hydrogen, reacted with the vaporous magnesium already available in this zone and MgO, $Mg_3N_2$ and $H_2$ formed.

If at each point of that part of the furnace which is situated behind a leakage the composition of the gas samples was examined, areas could be mapped out each of which corresponded to a certain composition of the gas. Reciprocally, from the fact that samples of gas taken off are of different composition the conclusion may be drawn that an untight point is present.

The disposition of a sufficient number of points at which gas is taken off enabled an untight place to be localized and the degree of difference in the composition of the samples of gas enabled a conclusion to be drawn with regard to the dimensions or permeability of the untight point.

*Example 2*

An evacuated reaction chamber through which in the normal course of operation a scavenging gas under slightly elevated pressure flowed was connected with a non-scavenged part of apparatus in which the atmosphere was the same as in the reaction chamber. By the introduction of a known quantity of the pure scavenging gas a current of gas was produced in this part of the apparatus and air which had penetrated into this part of the apparatus through an untight point could be detected by means of a sample of gas taken off.

300 liters of $H_2$ were introduced per hour into the non-scavenged part of the apparatus. A sample of gas taken off contained 3.3% of air. Hence follows that in this part of the apparatus an untight point was present through which 10 liters per hour of air could penetrate.

The application of a known comparison method with heat conducting cells, through one of which flowed the pure scavenging gas of known composition and known heat conductivity and through the other one of which flowed the gas to be examined, has, for example, proved useful in applicant's plant.

The process of the invention enables existing and forming leakages in industrial vacuum plants used in chemistry and metallurgy to be detected and to be treated accordingly.

We claim:

1. A process for detecting leaks in industrial vacuum plants for the thermal production of magnesium comprising taking samples of the inner gaseous atmosphere of said plant from a plurality of interior points of said plant by application of a vacuum at these points which is greater than that maintained within said plant, the atmosphere at the points within the plant being sampled prior to any contact thereof with a substance charged to the plant, and analyzing the sample gas composition for contaminants introduced through said leaks.

2. The process of claim 1 wherein a current of a known quantity of pure scavenging gas selected from the group consisting of hydrogen and rare gases is temporarily introduced into one part of the industrial vacuum plant and any change in concentration of said scavenging gas is determined by taking off samples at different points of the same part of the plant.

3. The process of claim 2 wherein the scavenging gas is argon.

References Cited in the file of this patent

UNITED STATES PATENTS

| | | |
|---|---|---|
| 2,371,217 | Booth | Mar. 13, 1945 |
| 2,658,728 | Evans | Nov. 10, 1953 |
| 2,675,493 | Grobel | Apr. 13, 1954 |
| 2,743,089 | Gardner et al. | Apr. 24, 1956 |
| 2,819,609 | Liebhafsky | Jan. 14, 1958 |
| 2,920,951 | Bretschneider et al. | Jan. 12, 1960 |
| 2,934,423 | Bretschneider et al. | Apr. 26, 1960 |
| 3,017,263 | Bretschneider et al. | Jan. 16, 1962 |
| 3,034,338 | Snyder | May 15, 1962 |

FOREIGN PATENTS

| | | |
|---|---|---|
| 876,476 | Great Britain | Sept. 6, 1961 |